(12) United States Patent
Tippetts

(10) Patent No.: US 10,930,305 B1
(45) Date of Patent: Feb. 23, 2021

(54) MAGNETIC PHONOGRAPH RECORD STABILIZER

(71) Applicant: Glen Tippetts, Bend, OR (US)

(72) Inventor: Glen Tippetts, Bend, OR (US)

( * ) Notice: Subject to any disclaimer, the term of this patent is extended or adjusted under 35 U.S.C. 154(b) by 0 days.

(21) Appl. No.: 16/692,940

(22) Filed: Nov. 22, 2019

(51) Int. Cl.
*G11B 3/61* (2006.01)
*F16C 39/06* (2006.01)

(52) U.S. Cl.
CPC .............. *G11B 3/61* (2013.01); *F16C 39/066* (2013.01); *F16C 2370/12* (2013.01)

(58) Field of Classification Search
None
See application file for complete search history.

(56) References Cited

U.S. PATENT DOCUMENTS

| | | | |
|---|---|---|---|
| 2,146,519 A * | 2/1939 | Zimmerman | G11B 17/00 369/266 |
| 3,588,123 A * | 6/1971 | Candella | G11B 3/5827 369/72 |
| 4,260,161 A * | 4/1981 | Frank | G11B 23/42 369/270.1 |
| 10,157,630 B2 * | 12/2018 | Vaughn | G11B 3/61 |
| 10,224,069 B1 * | 3/2019 | Williams | G11B 17/0282 |
| 2001/0008515 A1 * | 7/2001 | Takeuchi | F16F 15/363 369/264 |
| 2005/0071862 A1 * | 3/2005 | Asabata | G11B 17/0284 720/710 |

FOREIGN PATENT DOCUMENTS

| | | | | |
|---|---|---|---|---|
| DE | 202017004177 U1 | * | 11/2017 | F16F 15/03 |
| JP | 2003272101 A | * | 9/2003 | |
| SU | 431536 A1 | * | 5/1975 | |

* cited by examiner

*Primary Examiner* — William J Klimowicz
(74) *Attorney, Agent, or Firm* — Donn K. Harms

(57) ABSTRACT

A magnetic phonograph record stabilizer is configured to hold a phonograph record in a biased contact against a turntable. The stabilizer features a base which is engaged with a magnetic housing which is moveable from a first position where magnetic attraction biases the base toward the turntable. The magnetic housing is slidable to a second position eliminating the biasing from the magnetic flux so the stabilizer can be removed from the turntable.

19 Claims, 4 Drawing Sheets

MAGNETIC PHONOGRAPH RECORD STABILIZER

FIELD OF THE INVENTION

The disclosed device concerns phonograph records played upon rotating turntables. More particularly, it relates to a magnetic stabilizer providing releasable magnetic pressure to hold a phonograph record fixedly positioned while rotating on a phonograph turntable to enhance sound produced therefrom.

BACKGROUND OF THE INVENTION

The phonograph record is an analog sound storage component formed as a planar disc with recorded sound inscribed on a surface in the form of a modulated spiral groove. The groove providing the analog sound conventionally starts near the periphery of the round planar disc and ends near the center of the disc.

In use, the planar disk is situated to a removable engagement positioned atop a rotating turntable. An aperture, communicating through the center of the round planar disk forming each phonograph record, is sized to engage over and around a spindle situated in the center of the rotating turntable. The locating of the planar phonograph record, upon the surface of a rotating turntable, with the aperture of the phonograph record engaged around the spindle, positions the phonograph record for concurrent rotation with the turntable during playing of the phonograph record.

During such playing of the phonograph record, it will spin at the same speed as the turntable on which it is positioned. A needle located on a playing arm is positioned on the circumference of the phonograph record and will thereafter follow the spiral groove on the phonograph record toward the center thereof. During this travel, movement of the needle within depressions formed in the spiral groove, generates electric signals which are communicated to an amplifier which in turn, sends the electronic signals to loudspeakers. The loudspeakers reproduce the sounds which have been imparted to the spiral groove during "pressing" of the phonograph record from a master.

While the vast majority of media and sound produced modernly is handled by digital recordings and electronic playback of such digital recordings, a large number of audiophiles prefer the sound generation produced by phonograph records. This is especially true for music reproduction.

This phonograph record preference is conventionally explained by the fact that digital recordings break down the sound of music to bits and numerical code which is then reassembled by a microprocessor to generate the sound recorded. However, a phonograph recording is analog, and it is said that such allows for reproduction of subtle analog sound waves which are lost during digital compilation to bits and data.

In order to provide such sound reproduction, with the recorded subtilies held in the spiral groove on the phonograph record, it is most important that the rotation of the planar phonograph record continuously match that of the underlying turntable on which it sits. However, the matching of the rotation of the phonograph record to the rotation speed of the turntable, can be affected by slippage if the turntable surface is too slick or if the turntable is bumped.

An additional problem with conventional turntables is the tendency for the planar phonograph record itself to vibrate vertically or in a translating direction along the axis of the spiral. Such can be caused by the sound waves emanating from the loudspeakers reproducing the sound recorded on the record, which is known to cause the record to vibrate. Such vibration of the material forming the phonograph record frequently can cause the needle, following the recording track in the spiral groove, to bounce or to rise higher within the grove thereby reducing the quality of the sound.

The forgoing examples concerning phonograph records played upon metal and non-metal turntables, and issues regarding such, are intended to be illustrative and not exclusive, and they do not imply any limitations on the invention described and claimed herein. Various other limitations of the related art are known or will become apparent to those skilled in the art upon a reading and understanding of the specification below and the accompanying drawings.

SUMMARY OF THE INVENTION

The device herein provides a solution to the shortcomings of sound reproduction from planar phonograph records which are conventionally played upon planar phonograph turntables which are formed of metal or polymeric material. As noted, most such rotating turntables employ a needle mounted upon a rotating arm, which follows the spiral groove forming a sound track located on the surface of a phonograph record. To protect the surface of the phonograph record contacting the turntable during play, conventionally such turntables include a pliable and flexible pad which lays upon the planar surface of the turntable, sandwiched between the turntable and phonograph record. The pad, thus, supports the phonograph record during rotational play.

The device herein includes a magnetically attractive planar ring adapted for positioning underneath the flexible pad or mat which is positioned on the surface of the turntable. The planar ring is located to a sandwiched position in-between the turntable surface and the flexible pad positioned thereon. It is maintained centered on the turntable by a spindle opening which is adapted to engage with the turntable spindle located at the center point of the turntable. By adapted to engage the spindle of the turntable is meant that the circumference of the spindle opening is equal to or slightly larger than the circumference of the turntable spindle to which it engages such that it will slide thereon, and maintain the planar ring centered on the turntable spindle.

The stabilization device herein, additionally includes a cylindrical base, having a central aperture sized for engagement over and around the circumference of the spindle positioned at the center of the turntable. This cylindrical base has an annular planar projection such as a ring or blades projecting from the circumference of a sidewall. This planar projection such as the planar ring is at a first end of the base which is positioned closest to the turntable when operatively engaged therewith. This annular ring is preferably formed of polymeric or plastic or non magnetic material, and is adapted for positioning atop the central area of a phonograph record which has been operatively positioned upon the flexible turntable pad atop the underlying turntable. A pad may be engaged to the facing surface of the annular ring which contacts the surface of the phonograph record.

This cylindrical base has an axial cavity therein defined by an inner surface of a sidewall. The axial cavity is accessible through an opening located at the top or the second end of the cylindrical base. This cavity is sized to provide for a translating engagement of a magnet housing within this axial cavity of the base. A central aperture is centered within the axial cavity and communicates through a bottom wall thereof. As with the spindle opening formed in the planar ring, this central aperture is adapted to engage in the same fashion around the turntable spindle.

The magnetic housing in a translating engagement within the axial cavity within the sidewall of the base, moves between a first position, having a first side of the housing in contact with or adjacent to, the bottom or end wall at the first end of the base, to a second position. Translated to the second position, the first side of the magnetic housing slides away from the bottom end wall of the base, thereby positioning the first side of the housing adjacent to the opening in the sidewall at the second end of the base. This forms a gap between the first side of the magnetic housing and the bottom or end wall of the base. This sliding engagement may be permanent, or the magnetic housing can be removably engageable so long as lifting of the magnetic housing pulls the base from a position supported on the pad of the turntable, once the magnetic housing has been translated to the second position adjacent the opening.

Currently, a removable sliding engagement is provided by an annular recess formed below a first ledge and into the interior of the sidewall defining the axial cavity of the cylindrical base. This annular recess may intersect with a first plurality of vertical slots formed into a first ledge on the interior wall between the opening and the annular recess, and a second plurality of vertical slots, formed into a second ledge formed on the interior wall between the annular recess and the endwall at the first end of the cylindrical base. The first plurality of vertical slots is out of alignment with the second plurality of vertical slots.

Using this removable configuration, a user aligns projections extending from the exterior surface of the magnetic housing with the first plurality of vertical slots and inserts the magnetic housing into the axial cavity of the base until the projections reach the annular recess. Thereafter, the magnetic housing must be rotated to a second alignment of the projections with the second plurality of vertical slots. Upon this second alignment, the magnetic housing is translatable within the second plurality of vertical slots to positions adjacent the first end of the base and a second position where the projections enter the annular recess and contact a sidewall thereof.

This configuration allowing translation of the magnetic housing within the second plurality of vertical slots allows the user to slide the magnetic housing to the first position from the second position and back and forth. In this first position, the magnetic flux from the magnet within the magnetic housing attracts and biases the planar ring and magnetic housing toward each other. This biasing by the magnetic flux forms a biased sandwiched engagement of the turntable pad and any phonograph record thereon in between the base, thereby securing the phonograph record in place.

So secured by the device herein, the planar phonograph record is biased or pressed against the surface of the flexible mat located on the metal or polymeric turntable. This biasing contact thereby prevents vibration from sound waves produced by loudspeakers proximate to the phonograph, from vibrating the phonograph record since the device herein using the magnetic force, biases the phonograph record against the underlying pad. In this fashion the device herein, significantly reduces or eliminates vibration to prevent bouncing of the needle and arm during playing of the phonograph record.

Movement of the magnetic housing within the second plurality of vertical slots, toward contact of the projections therefrom with an upper edge of the annular recess, dissipates the attraction of the magnetic flux with the planar ring.

Because the magnetic attraction is reduced enough to no longer attract the planar ring with enough force to move it, the user can continue upward motion away from the turntable on the magnetic housing. This causes the projections on the magnetic housing to contact the edge of the annular recess, and to then lift both the magnetic housing, and the base, from their position on the turntable. Thereafter, the phonograph record may be changed and the device placed on top of it.

An annular shoulder projects from the exterior circumference of the base at the first end thereof. This shoulder has a planar bottom surface which is situated substantially aligned with a bottom surface of the base at the second end. This is preferable in that it forms an enlarged contact of the second end of the base, and the bottom surface of the annular shoulder with the underlying phonograph record.

Additionally, the annular shoulder is preferred in all modes of the device because it provides the user with a pressure point for their finger to hold the base against the phonograph record during translation of the magnetic housing upward, toward the annular recess. This is preferred to prevent the lifting of the phonograph record, the turntable pad and the planar ring during movement of the magnetic housing to the second position. Once in this second position, as noted, the magnetic housing lacks the magnetic flux and attraction to impart sufficient force to lift the planar ring or turntable pad and phonograph record.

In all modes of the device, a ring shaped magnet is preferable. While a bare ring shaped magnet will function to achieve the biased compressive contact of a phonograph record against the turntable and turntable pad, to improve upon the solid positioning thereof on a turntable to prevent needle bouncing and the like. However, it was found in experimentation that magnets housed within a metal exterior jacket, which covers all but a small annular gap section of the magnet surrounding the spindle, worked better for provision of a biasing force and for prevention of communication of the magnetic field from the magnet, to the needle cartridge.

As such, magnets, such as neodymium magnets, positioned within such as metal jacket or case, are preferred for the enhanced flux projected therefrom which enhances the biased contact of the phonograph record against the pad on the turntable located between the housing and the planar ring.

With respect to the above description, before explaining at least one preferred embodiment of the herein magnetic phonograph record stabilizing device in detail, it is to be understood that the invention is not limited in its application to the details of construction and to the arrangement of the components in the following description or illustrated in the drawings. The invention herein described and shown is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other bias generating magnetic phonograph record stabilizers, and for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The term "substantially" when employed herein, means plus or minus twenty percent unless otherwise designated in range.

It is an object of the present invention to provide a stabilizing device to hold phonograph records biased against a turntable pad in a manner preventing vibration of the phonograph record such as that caused by sound waves from loudspeakers.

It is an additional object of this invention to provide such a magnetic stabilizing device which is easily engageable and disengageable by a user but provides for a highly stable biasing engagement of a phonograph record with a pad and turntable.

It is a further object of this invention, to provide such a magnetic based biasing component which containerizes the magnet in a metal cover to prevent or minimize or prevent communication of the generated magnetic field, to a phonograph needle cartridge proximate thereto.

These and other objects, features, and advantages of the present magnetic phonograph record stabilizer, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed game system and method. It is intended that the embodiments and figures disclosed herein are to be considered illustrative of the invention herein, rather than limiting in any fashion.

DETAILED DESCRIPTION OF THE INVENTION

Figure 1:
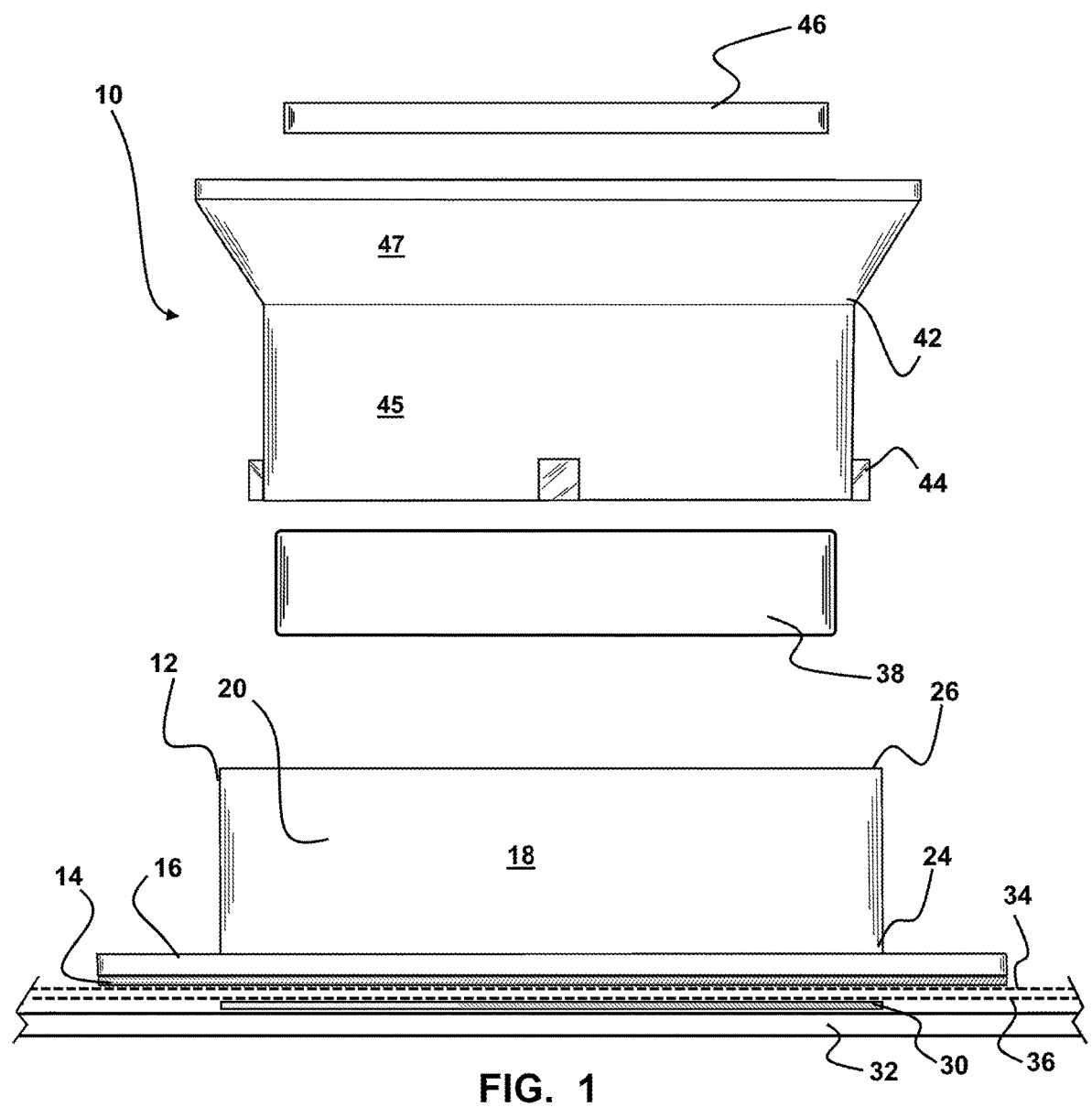
FIG. 1 depicts an exploded view of the components of the device herein.

In this description, the directional prepositions of up, upwardly, down, downwardly, front, back, top, upper, bottom, lower, left, right and other such terms refer to the device as it is oriented and appears in the drawings and are used for convenience only and such are not intended to be limiting or to imply that the device has to be used or positioned in any particular orientation.

Figure 4:
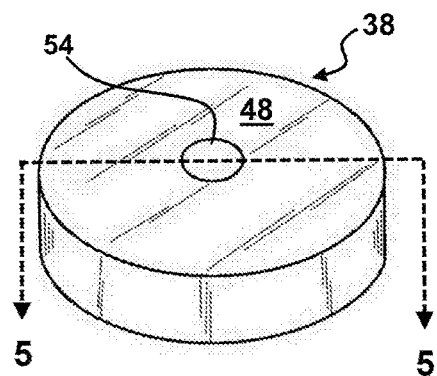
FIG. 4 depicts the magnet herein in an operative position such as it would be positioned in FIG. 2, and showing a metallic top wall.
Figure 5:
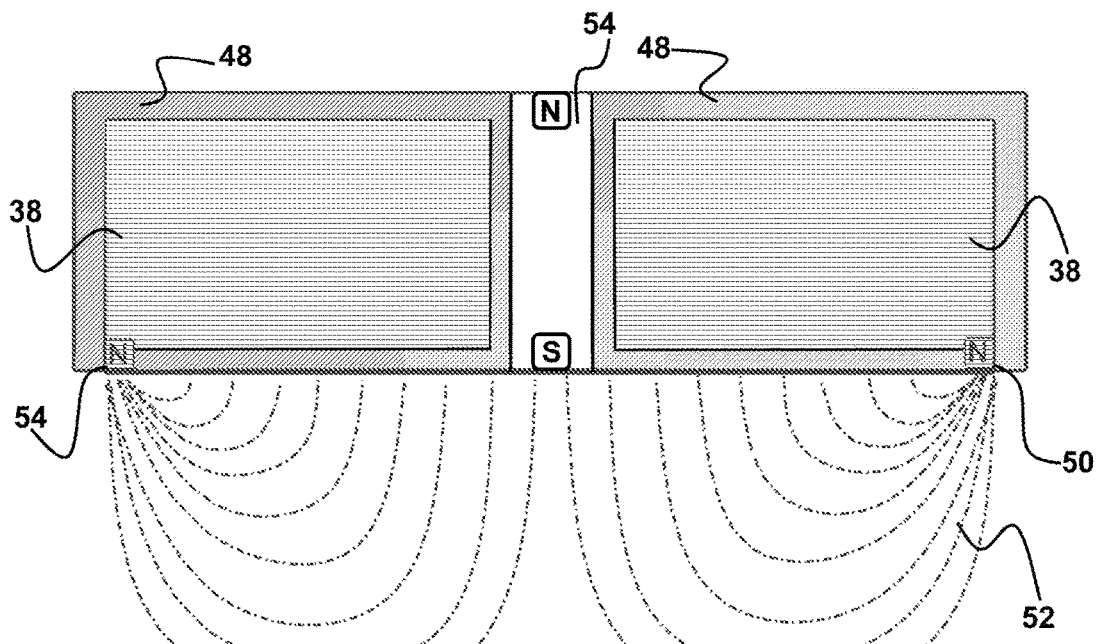
FIG. 5 depicts the magnetic flux emitted by the magnet when positioned within the magnetic housing such as in FIG. 2, and the enhanced flux pattern provided by the metal covering the magnet in all areas but the annular gap shown in FIG. 3.
Figure 6:
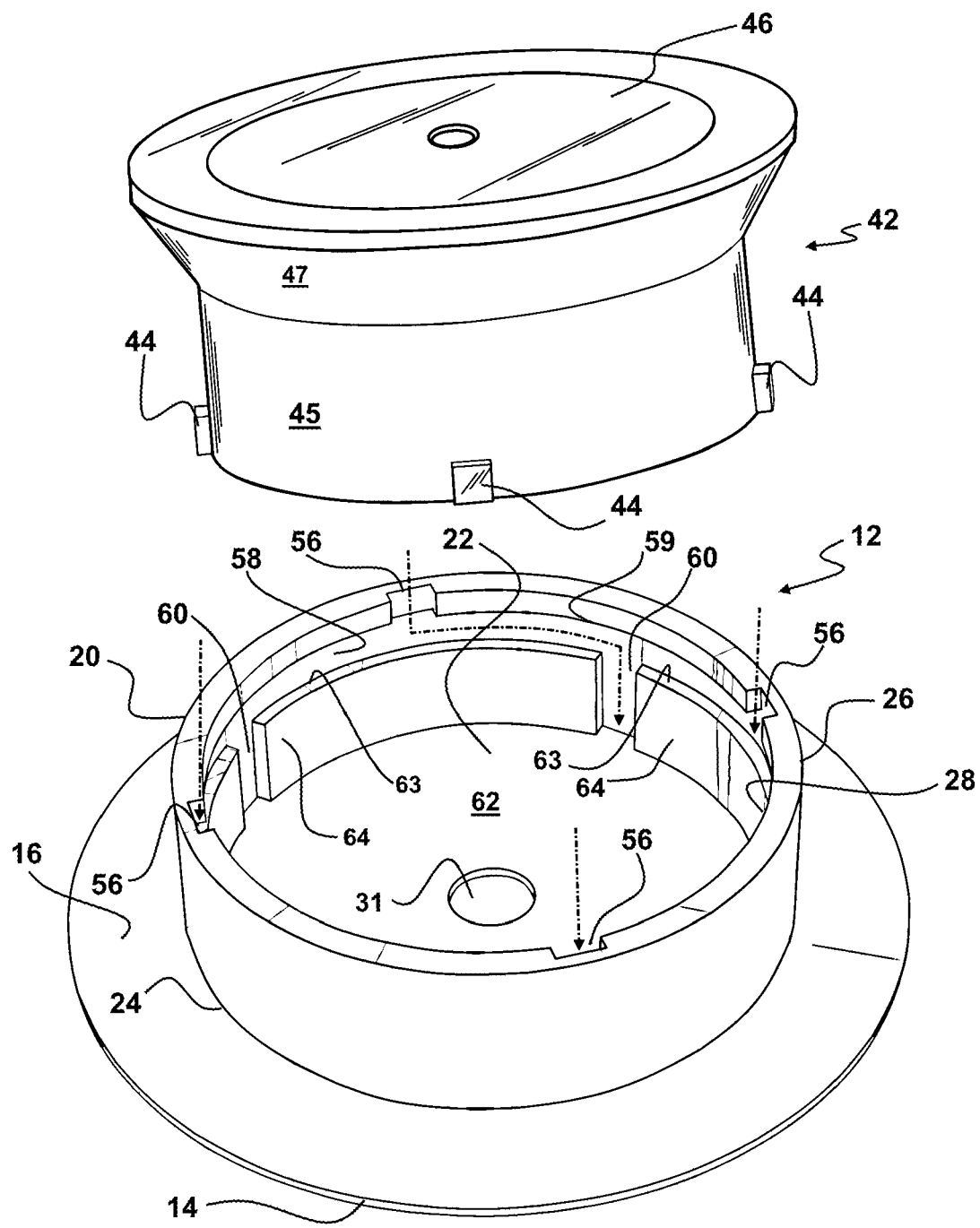
FIG. 6 depicts the removable engagement of the magnetic housing within the axial cavity of the base through the positioning of projections within first and second pluralities of vertical recesses.

Now referring to drawings in FIGS. 1-8, wherein similar components are identified by like reference numerals, there is seen in FIG. 1, an exploded view of the components of the device 10 herein. As shown, a base 12 may include a pad 14 formed of flexible and compressible material, such as one formed of cork or rubber, on a lower surface thereof, and upon a lower surface of an annular shoulder 16 extending circumferentially from and around the exterior surface 18 of a base sidewall 20 of the base 12. This base sidewall 20 surrounds and defines a cavity 22 (FIG. 6) of the base 12 extending from a first end 24 of the base sidewall 20 adjacent the shoulder 16 and a second end 26 of the sidewall 20 which surrounds an opening 28 (FIG. 6).

A planar ring 30 is provided which is adapted for positioning between the turntable 32 and the turntable pad 34 conventionally positioned atop a turntable 32 to support a phonograph record 36 thereon. This planar ring 30 is formed of a ferromagnetic metal material which is comprised of, or includes, one or a plurality of such ferromagnetic metals from a group including iron, cobalt and nickel.

Also shown in FIG. 1, is a magnet 38 which in operative positioning, will be located within an interior cavity 40 (FIG. 2) of a housing 42. The exterior circumference of the housing 42 is defined by a housing sidewall 45 and has one or a plurality of projections 44 extending therefrom. These projections 44 are sized for a translating or sliding engagement with the cavity 22 formed within the base sidewall 20 of the base 12.

Figure 7:
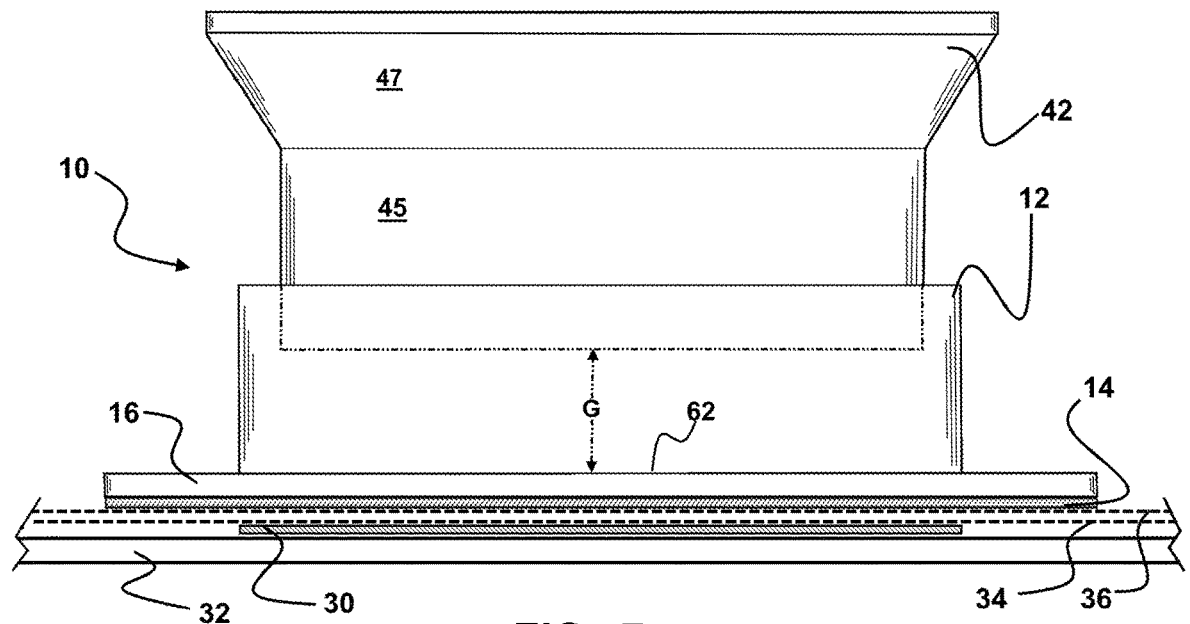
FIG. 7 depicts the assembled device showing the magnetic housing translated to the second position wherein the flux is eliminated or reduced in the attraction to the planar ring, and in position to remove the device from the spindle.
Figure 8:
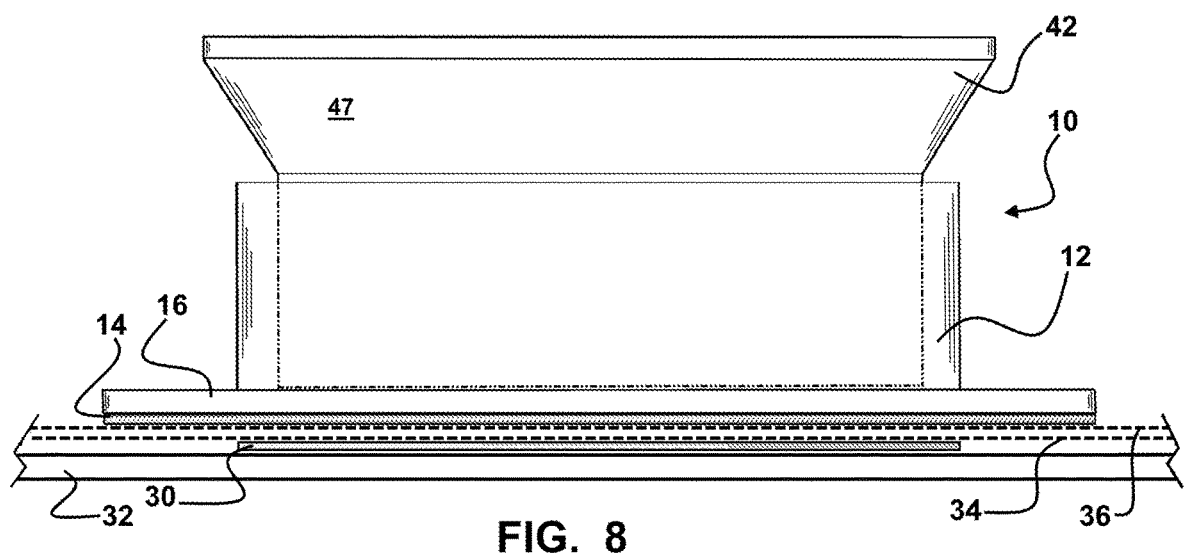
FIG. 8 shows the device herein in the first position, with the bottom of the magnetic housing positioned in contact with or adjacent the bottom wall at first end of the of the base, within the axial cavity.

This translating engagement allows for the housing 42 to be translated from a first position shown in FIG. 8 where the end wall 43 is in contact with or adjacent the bottom wall 62, and to a second position shown in FIG. 7. A grip 47 is also shown extending at an angle above, and projecting past, the housing sidewall 45. The angle of the grip 47 surface is preferably between 30-80 degrees relative to the surface of the housing sidewall 45 and the grip 47 is preferably formed as an annular grip 47 surface extending around the entire housing 42 so as to maintain the balance of the device 10 during rotation. The overhang of the grip 47 makes it easy for a user to place a thumb and finger on opposite sides thereof, and lift or hold the device 10 elevated when needed. Forming the grip 47 to have a circumference at the widest point thereof adjacent the insert 46, to be at least 10 percent larger than the circumference of the housing sidewall 45, provides for easy engagement by the hand of the user.

Additionally shown in FIG. 1 and FIG. 6 is an insert 46 which is removably engageable to the housing 42. This planar insert 46 has an exterior circumference adapted to removably engage within the interior circumference of the opening formed in a 45 RPM phonograph record to position a spindle hole therein allowing for the device 10 to be employed with such short play phonograph records as well as longer play phonograph records 36 shown in FIG. 1.

Figure 2:
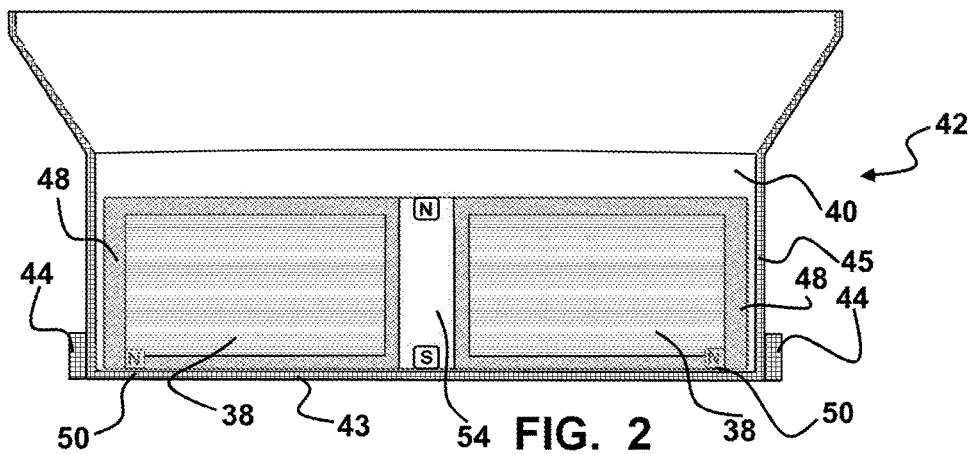
FIG. 2 shows a sectional view of the device herein with the magnetic housing which is engaged to be translated to the first position at or adjacent the first end of the base.

Depicted in FIG. 2 is a sectional view of the housing 32 of the device 10 herein. As shown, a magnet 38 is located within the interior cavity 40 of the housing 42 adjacent an endwall 43 of the housing at an engagement end on a first side thereof. As noted, the magnet 40 is preferably ring shaped as in FIGS. 3-4, to provide a more uniform flux and magnetic attraction of the magnet 40 with the planar ring 30 which is adapted for positioning underneath the turntable pad 34 of the conventional turntable 32.

Figure 3:
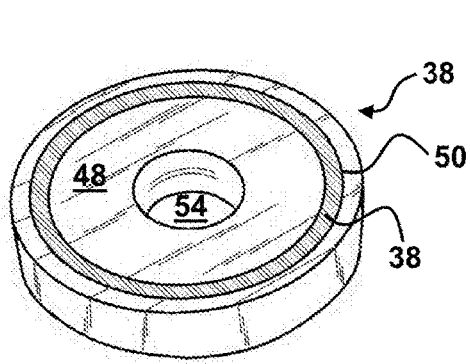
FIG. 3 depicts a bottom or lower view of a preferred magnet configuration having a metal housing surrounding the ring shaped magnet and showing an annular gap in the metal housing.

FIGS. 3-4 depict an especially preferred mode of the magnet 38 of the device 10 herein. As shown, the magnet 38 is encased or surrounded by a metallic cover 48 for all but an annular opening 50 portion which communicates through the metallic cover 48. This metallic cover 48 formed of a magnetically attractive metal such as nickel or steel or the like. The metallic cover 48 in combination with the annular opening 50 which exposes a ring shaped area of the magnet 38 within the annular opening 50, is preferred as noted above, because it serves to form a lens for the magnetic flux 52 which focuses the magnetic flux 52 in a pattern running between the annular opening 50 and the central passage 54 communicating through the center of the ring shaped magnet. This focusing or shape forming of the flux 52, in such a pattern, has been found in experimentation to better impart a magnetic attraction to the planar ring 30 underneath the turntable pad 34 on the turntable 32 during use.

Further, this means of focusing the magnetic flux 52 was found to also keep it from communicating with the cartridge holding the needle on the tone arm of the turntable. Without such flux forming, severe interference is highly probable from the interference caused by the generation of electronic signals in the cartridge of the tone arm.

As such, while a ring shaped magnet will work, the encasing of the ring shaped magnet in a metallic housing with the magnet 38 and magnetic field emitting from an annular opening 50 in the metallic housing, is preferred. This is because such a configuration maximizes the attraction of the planar ring 30, while minimizing or eliminating static and errant electronic signals generated from the needle cartridge as it gets close to the spindle area of the record.

An example of the flux 52 pattern provided by housing the ring-shaped magnet 38 within a metallic cover 48 having a ring shaped or annular opening 50 therein, is shown in FIG. 5. As shown, the magnetic flux 52 emanates primarily from the annular opening 50 area and travels in a pathway between that annular opening 50 and a central passage 54 surrounded by the metallic cover 48 or casing, and communicating through the structure.

Shown in FIG. 6, is a configuration of the device 10 where the housing 42 is removably engageable with the base 12. As noted above, so long as the housing 42 will translate from the first position shown in FIG. 8, to the second position shown in FIG. 7, the device 10 can be formed inseparable. However, it may provide more utility configured as in FIG. 6 to allow for example, magnets 38 of differing strengths to be employed in combination with the same base 12.

However, if formed in a non removable engagement, such as using flexible polymeric materials that can bend during assembly, the housing 42 is formed in a diameter to slidably engage within the cavity 22 of the base 12. A stop, such as the depicted projections 44 or the equivalent, will engage with a first ledge 61 or the like on the base 12 to prevent separation as the housing 42 is moved to the second position as in FIG. 7. Such a stop can be one or a plurality of projections 44 which contact an edge 59 of a ledge 61 formed into the base sidewall 20 surrounding the cavity 22 in which it slides.

In such a simpler version of the device 10 which is also a significant advance in the art, it can be assembled with the projections 44 permanently located in the recess 58 which is formed below the edge 59 of a first ledge 61, and extends toward the bottom wall 62. While this configuration will not allow the housing 42 to be held supported and spaced by the gap G (FIG. 7) above the bottom wall 62, when not being lifted by the user, it will still allow the user to hold the shoulder 16 with a finger. With the finger on the shoulder 16, the housing 42 can then translate a distance D away from the bottom wall 62 of the base 12 to release or reduce the magnetic attraction to the planar ring 30. This will allow the device 10 to be lifted from engagement to the spindle 33 of the turntable 32 to remove or change the phonograph record, without pulling on the planar ring 30 and lifting the turntable pad 34 during such a removal.

In a more preferred mode depicted in the exploded view of FIG. 6, the housing 42 has at least one, but preferably a plurality of projections 44 extending to distal ends from first ends engaged with the housing sidewall 45 of the housing 42. Locating these projections 44 substantially at or adjacent the intersection of the housing sidewall 45 with the endwall 43 positioned adjacent the first side of the base (FIG. 2), provides for more distance of translation of the housing 42 when operatively engaged within the cavity 22 extending above the bottom wall 62 and shoulder 16 projecting from the base 12.

As shown, the plurality of projections 44 are located on the housing 42 in positions to align with a first plurality of vertical slots 56 communicating through the first ledge 61 and into the annular recess 58 below the lower edge 59 of the first ledge 61. When positioned within the slots 56 the projections 44 follow a first pathway of travel for the projections 44 past the ledge 61 and into the annular recess 58 in-between the edge 59 of the first ledge 61 and edge 63 of a second ledge 64. The housing 42 can be maintained elevated above the bottom wall 62 of the cavity 22 to hold the gap G, by positioning the projections 44 atop the edge 63 of the second ledge 64.

Once within the annular recess 58, and supported by the projections 44 on the edge 63, a rotation of the housing 42, will align the projections 44 with a second pathway of travel formed by a plurality of second vertical slots 60 running through the second ledge 64. These slots 60 are in communication with the annular recess 58 and are registered in positions to match those of the projections 44.

In all modes of the device 10 whether the housing 42 is removable from the base 12 or permanently engaged, the housing 42 must be in a translating engagement with the base 12 whereby it can travel to first position as in FIG. 8, where the endwall 43 and the magnet 38 are located adjacent the bottom wall 62. By adjacent the bottom wall 62 is meant the endwall 43 is at a position which is closer to the bottom wall 62 of the axial cavity 22 and further from the opening 28 at the first end of the base 12.

This communicates the strongest magnetic force or flux 52 to attract the planar ring 30.

In this operative engagement, the housing 42 must be translatable to the second position as in FIG. 7, wherein the endwall 43 is located adjacent the opening 28 at the second end of the base 12. In this second position, the magnetic flux 52 has minimal or no attraction to the planar ring 30. The endwall 43 being located adjacent the opening 28, is defined herein as the distance of the endwall 43 from the bottom wall 62 being larger than the distance between the endwall 43 and the opening 28.

Additionally, once at this second position, the housing 42 must be connected to the base 12, such that continuing lifting of the housing 42, will thereby elevate the device 10 with housing 42 connected to the base 12, above and away from the phonograph record 36, turntable pad 34, and turntable 32, and removed from engagement. This removal allows the phonograph record 36 to be removed and replaced before the device 10 is situated thereupon again.

Currently, the projections 44, when positioned within the annular recess 58, will contact an edge 59 the first ledge 61 on one side of the annular recess 58. Continued lifting thereby causes both the housing 42 and the base 12 connected by the projections 44 against the edge 59 of the first ledge 61, to raise from the operative position of FIGS. 6-7, and separate from the phonograph record 36, wherein the device 10 can be placed on a shelf for temporary storage.

As noted, shown in FIG. 7 is the assembled device 10 showing the magnetic housing 42, translated to the second position. This second position minimizes or eliminates the magnetic attraction of the flux 52 from the magnet 38 with the planar ring 30, allowing the device 10 to be removed. As also noted above, the annular shoulder 16 extending to a distal edge from a first side connected to the sidewall 18 of the base 12, provides a finger engageable restraint. This restraint defines a point for contact for a finger of the user, to hold the device 10, and especially the base 12, in position contacting the pad 34 of the turntable during transition from the first position of FIG. 8 to the second position of FIG. 7. Employing such a restraint, in the form of a projection such as an annular shoulder 16 extending from the base 12, thereby prevents the base 12, and the underlying planar ring 30, from moving during upward movement of the housing 12 to the second position of FIG. 7. This, of course, also maintains the turntable pad 34 located on the turntable until the magnet is in the second position of FIG. 7, and no longer pulling on the planar ring 30 with sufficient force that it will lift the turntable pad when the device 10 is lifted from the turntable.

This projecting restraint, such as the depicted annular shoulder 16, or at least one or a plurality of planar projections extending from connections to the base sidewall 20, is consequently preferred in all modes of the device 10 herein. Such is preferred to prevent movement of the base 12 away from its position resting on the phonograph record 36, while the user pulls the housing 42 to the second position of FIG. 7, from the first position of FIG. 8. The annular shoulder 16 is currently preferred when formed as depicted, as it helps maintain the balance of the device 10, especially where used with 45 RPM or 78 RPM phonograph records 36. However, a plurality of planar projections with gaps therebetween in proper spacing around the circumference of the base 12, would also work and if spaced properly maintain rotational balance.

It should be noted that any of the different depicted and described configurations and components of the magnetic phonograph record stabilizer herein, can be employed with any other configuration or component shown and described as part of the device herein. Additionally, while the present invention has been described herein with reference to particular embodiments thereof and/or steps in the method of production or use, a latitude of modifications, various changes and substitutions are intended in the foregoing disclosure, and it will be appreciated that in some instance some features, or configurations, of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A phonograph record stabilizer, comprising:
a base, said base having a base sidewall extending from a bottom wall at a first end of said base;
said bottom wall having a spindle opening therein, adapted to encircle a spindle of a turntable;
said base sidewall having an interior surface defining an axial cavity extending from said bottom wall at said first end of said base to an opening in said base sidewall at a second end of said base;
a housing, said housing having a housing sidewall extending from an endwall at a first side of said housing;
said housing sidewall defining an internal cavity extending from said endwall at said first side of said housing to a second side of said housing;
a magnet positioned within said internal cavity;
a planar ring, said planar adapted for positioning underneath a turntable pad of said turntable;
said housing in a sliding engagement of said housing sidewall within said axial cavity; and
said housing translatable between a first position locating said housing endwall adjacent said bottom wall, and a second position locating said housing endwall adjacent said opening at said second side of said housing, whereby with said planar ring positioned between said turntable and said turntable pad, and with said first end of said base positioned atop said turntable pad, said magnet biases said base toward said planar ring with said housing translated to said first position.

2. The phonograph record stabilizer of claim 1, additionally comprising:
a planar projection extending from said base sidewall at said first end of said base; and
said planar projection defining a restraint to hold said first end of said base atop said turntable pad, during a translation of said housing from said first position to said second position.

3. The phonograph record stabilizer of claim 2, additionally comprising:
said planar projection being a planar ring projecting around a circumference of said base sidewall.

4. The phonograph record stabilizer of claim 3 additionally comprising:
said magnet being ring shaped and having a central passage communicating therethrough;
said magnet encased within a metallic housing;
an annular opening communicating through said metallic housing on a first side of said metallic housing; and said annular opening defining a lens focusing magnetic flux from said magnet between said annular opening and said central passage.

5. The phonograph record stabilizer of claim 4 additionally comprising:
a plurality of projections extending from said housing sidewall at said first side of said housing;
a first ledge projecting from said interior surface of said base sidewall into said axial cavity;
said plurality of projections contacting said first ledge with said housing moved to said second position, whereby said base is lifted concurrently with a lifting of said housing from a position on a turntable by a user.

6. The phonograph record stabilizer of claim 5 additionally comprising:
a second ledge projecting from said interior surface of said base sidewall into said axial cavity;
an annular recess positioned between said first ledge and said second ledge;
said plurality of projections slidably engaged in a plurality of slots communicating through said second ledge; and
a positioning of said projections within said annular recess and atop an edge of said second ledge, holding said housing in said second position.

7. The phonograph record stabilizer of claim 3 additionally comprising:
a plurality of projections extending from said housing sidewall at said first side of said housing;
a first ledge projecting from said interior surface of said base sidewall into said axial cavity;
said plurality of projections contacting said first ledge with said housing moved to said second position, whereby said base is lifted concurrently with a lifting of said housing from a position on a turntable by a user.

8. The phonograph record stabilizer of claim 7 additionally comprising:
a second ledge projecting from said interior surface of said base sidewall into said axial cavity;
an annular recess positioned between said first ledge and said second ledge;
said plurality of projections slidably engaged in a plurality of slots communicating through said second ledge; and
a positioning of said projections within said annular recess and atop an edge of said second ledge, holding said housing in said second position.

9. The phonograph record stabilizer of claim 2, additionally comprising:
said magnet being ring shaped and having a central passage communicating therethrough;
said magnet encased within a metallic housing;
an annular opening communicating through said metallic housing on a first side of said metallic housing; and
said annular opening defining a lens focusing magnetic flux from said magnet between said annular opening and said central passage.

10. The phonograph record stabilizer of claim 9 additionally comprising:
a plurality of projections extending from said housing sidewall at said first side of said housing;
a first ledge projecting from said interior surface of said base sidewall into said axial cavity;
said plurality of projections contacting said first ledge with said housing moved to said second position, whereby said base is lifted concurrently with a lifting of said housing from a position on a turntable by a user.

11. The phonograph record stabilizer of claim 10 additionally comprising:
a second ledge projecting from said interior surface of said base sidewall into said axial cavity;
an annular recess positioned between said first ledge and said second ledge;
said plurality of projections slidably engaged in a plurality of slots communicating through said second ledge; and
a positioning of said projections within said annular recess and atop an edge of said second ledge, holding said housing in said second position.

12. The phonograph record stabilizer of claim 2 additionally comprising:
a plurality of projections extending from said housing sidewall at said first side of said housing;
a first ledge projecting from said interior surface of said base sidewall into said axial cavity;
said plurality of projections contacting said first ledge with said housing moved to said second position, whereby said base is lifted concurrently with a lifting of said housing from a position on a turntable by a user.

13. The phonograph record stabilizer of claim 12 additionally comprising:
a second ledge projecting from said interior surface of said base sidewall into said axial cavity;
an annular recess positioned between said first ledge and said second ledge;
said plurality of projections slidably engaged in a plurality of slots communicating through said second ledge; and
a positioning of said projections within said annular recess and atop an edge of said second ledge, holding said housing in said second position.

14. The phonograph record stabilizer of claim 1, additionally comprising:
said magnet being ring shaped and having a central passage communicating therethrough;
said magnet encased within a metallic housing;
an annular opening communicating through said metallic housing on a first side of said metallic housing; and
said annular opening defining a lens focusing magnetic flux from said magnet between said annular opening and said central passage.

15. The phonograph record stabilizer of claim 14 additionally comprising:
a plurality of projections extending from said housing sidewall at said first side of said housing;
a first ledge projecting from said interior surface of said base sidewall into said axial cavity;
said plurality of projections contacting said first ledge with said housing moved to said second position, whereby said base is lifted concurrently with a lifting of said housing from a position on a turntable by a user.

16. The phonograph record stabilizer of claim 15 additionally comprising:
a second ledge projecting from said interior surface of said base sidewall into said axial cavity;
an annular recess positioned between said first ledge and said second ledge;
said plurality of projections slidably engaged in a plurality of slots communicating through said second ledge; and
a positioning of said projections within said annular recess and atop an edge of said second ledge, holding said housing in said second position.

17. The phonograph record stabilizer of claim 1 additionally comprising:
a plurality of projections extending from said housing sidewall at said first side of said housing;
a first ledge projecting from said interior surface of said base sidewall into said axial cavity;

said plurality of projections contacting said first ledge with said housing moved to said second position, whereby said base is lifted concurrently with a lifting of said housing from a position on a turntable by a user.

18. The phonograph record stabilizer of claim 17 additionally comprising:
a second ledge projecting from said interior surface of said base sidewall into said axial cavity;
an annular recess positioned between said first ledge and said second ledge;
said plurality of projections slidably engaged in a plurality of slots communicating through said second ledge; and
a positioning of said projections within said annular recess and atop an edge of said second ledge, holding said housing in said second position.

19. The phonograph record stabilizer of claim 18 additionally comprising:
said plurality of projections contacting said first ledge with said housing moved to said second position, whereby said base is lifted concurrently with a lifting of said housing from a position on a turntable by a user.

* * * * *